United States Patent
Mc Hale

[11] Patent Number: 5,630,672
[45] Date of Patent: May 20, 1997

[54] BALL AND SOCKET JOINT

[75] Inventor: Michael J. Mc Hale, Saginaw, Mich.

[73] Assignee: General Motors Corporation, Detroit, Mich.

[21] Appl. No.: 551,225

[22] Filed: Oct. 30, 1995

[51] Int. Cl.$^6$ .................................................. F16C 11/08
[52] U.S. Cl. ........................ 403/135; 403/133; 403/140
[58] Field of Search ................................. 403/135, 140, 403/133, 137, 138, 122, 142, 141, 139

[56] References Cited

U.S. PATENT DOCUMENTS

| | | | |
|---|---|---|---|
| 2,715,766 | 7/1955 | Ricks | 29/441 |
| 3,025,090 | 3/1962 | Langen | 287/87 |
| 3,091,486 | 5/1963 | Baker | 287/87 |
| 3,226,141 | 12/1965 | Sullivan, Jr. | 403/135 |
| 3,363,921 | 1/1968 | Gottschald | 287/90 |
| 3,367,728 | 2/1968 | Labbie | 403/135 X |
| 3,408,124 | 10/1968 | Melton et al. | 308/238 |
| 3,429,598 | 2/1969 | Scheublein, Jr. et al. | 287/87 |
| 3,787,127 | 1/1974 | Cutler | 403/133 |
| 4,162,859 | 7/1979 | McAfee | 403/75 |
| 4,318,627 | 3/1982 | Morin | 403/140 X |
| 4,358,211 | 11/1982 | Goodrich, Jr. et al. | 403/27 |
| 4,511,277 | 4/1985 | McCabe | 403/140 |
| 4,577,989 | 3/1986 | Ito | 403/135 X |
| 4,629,352 | 12/1986 | Nemoto | 403/128 |
| 4,695,181 | 9/1987 | Rahmede | 403/135 |
| 4,722,631 | 2/1988 | Tagami | 403/133 |
| 5,152,628 | 10/1992 | Broszat et al. | 403/135 X |
| 5,188,477 | 2/1993 | Idosako et al. | 403/138 X |
| 5,368,408 | 11/1994 | Shimizu et al. | 403/140 |
| 5,395,176 | 3/1995 | Zivkovic | 403/137 X |

FOREIGN PATENT DOCUMENTS 886571  1/1960  United Kingdom .

Primary Examiner—Kenneth J. Dorner
Assistant Examiner—Harry C. Kim
Attorney, Agent, or Firm—Charles E. Leahy

[57] ABSTRACT

According to the invention, a stud has a spherical ball with upper and lower hemispheres and is seated within a socket housing. The socket housing includes a bore defining an access through which the stud may be inserted into the housing and a hemispherical cavity surface for seating the upper hemisphere of the spherical ball. A housing plug closes off the bore of the socket housing and has a hemispherical cavity surface for receiving the lower hemisphere of the spherical ball. A molded plastic spherical bearing liner is interposed between the spherical ball and the hemispherical cavities of the socket housing and the housing plug. The bearing liner has an unsegmented upper hemisphere which acts between the hemisphere of the spherical ball and the hemispherical cavity of the socket housing. The bearing liner also has a lower hemisphere integral with the upper hemisphere and segmented by longitudinal extending slots therethrough to provide an even numbered plurality of resilient spring fingers. These spring fingers are molded to alternately curve inwardly and outwardly. The inward curving fingers grip the spherical ball while the outwardly curving fingers apply spring force against the hemispherical cavity of the housing plug, thereby providing reliable low friction relative movement while simultaneously eliminating lash in the ball and socket joint.

4 Claims, 2 Drawing Sheets

BALL AND SOCKET JOINT

The invention relates to a ball and socket joint for connecting a vehicle steering tie rod to a steering knuckle arm and, more particularly, provides an improved bearing liner acting between a socket housing assembly and a ball stud.

BACKGROUND OF THE INVENTION

It is well known in motor vehicle steering systems to employ a ball and socket joint for connecting together the tie rod and the steering knuckle arm. The tie rod assembly typically includes a rod end housing having a bore for receiving a stud. The housing bore includes a spherical surface for receiving a spherical ball of the stud. A housing plug is installed into the bore to close off the bore, and has a spherical surface which receives the spherical ball of the stud.

A bearing liner is typically provided within a space between the spherical ball of the stud and the spherical cavity of the housing.

When in use, it will be understood that the ball and socket joint must be free to angulate and rotate while being subjected to thrust and impact stresses in the vertical and horizontal directions. Accordingly, the ball and socket joint must be sufficiently loose and friction free to accommodate the necessary relative movements and yet sufficiently tight to be free of lash and vibration. The present invention provides a new and improved ball and socket joint.

BRIEF SUMMARY OF THE INVENTION

According to the invention, a stud has a spherical ball with upper and lower hemispheres and is seated within a socket housing. The socket housing includes a bore defining an access through which the stud may be inserted into the housing and a hemispherical cavity surface for seating the upper hemisphere of the spherical ball. A housing plug closes off the bore of the socket housing and has a hemispherical cavity surface for receiving the lower hemisphere of the spherical ball. A molded plastic spherical bearing liner is interposed between the spherical ball and the hemispherical cavities of the socket housing and the housing plug. The bearing liner has an unsegmented upper hemisphere which acts between the hemisphere of the spherical ball and the hemispherical cavity of the socket housing. The bearing liner also has a lower hemisphere integral with the upper hemisphere and segmented by longitudinal extending slots therethrough to provide an even numbered plurality of resilient spring fingers. These spring fingers are molded to alternately curve inwardly and outwardly. The inward curving fingers grip the spherical ball while the outwardly curving fingers apply spring force against the hemispherical cavity of the housing plug, thereby providing reliable low friction relative movement while simultaneously eliminating lash in the ball and socket joint.

BRIEF DESCRIPTION OF THE DRAWINGS

These and other features, objects and advantages will become apparent upon consideration of the Description of the Preferred Embodiment and the appended drawings in which.

DESCRIPTION OF THE PREFERRED EMBODIMENT

Figure 1:
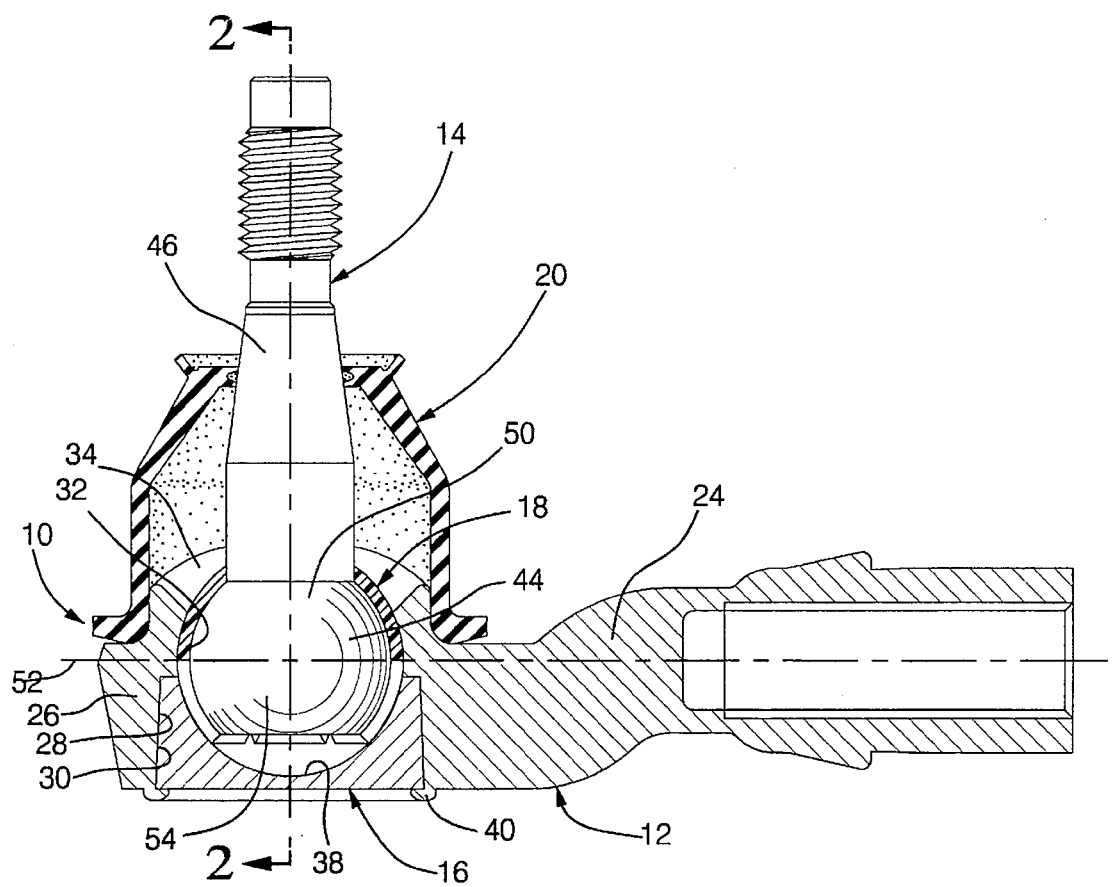
FIG. 1 is a side elevation view of the ball and socket joint having parts broken away and in section.

Referring to FIG. 1, it is seen that an outer tie rod assembly generally indicated at 10 is comprised of a tie rod socket housing 12, a ball stud 14, a housing plug 16, bearing liner 18, and seal 20.

The housing 12 is molded or cast of a suitable material such as aluminum, plastic or composite and includes a shank 24 and hub 26. The hub 26 has a stepped bore 28 therethrough which defines a access opening 30, a spherical cavity surface 32 and an articulation slot 34.

The access opening 30 of the housing bore 28 is closed by the housing plug 16. The housing plug 16 has an internal spherical cavity surface 38. The housing plug 16 is retained within the housing 12 by a swaged over lip 40 of the housing 12.

The ball stud 14 has a spherical ball 44 integrally connected with a threaded stud 46. As seen in FIG. 1, the slot 34 of housing 12 permits the threaded stud 46 to angulate relative the housing 12 by permitting the threaded stud 46 to transit the slot 34.

The ball 44 includes an upper hemisphere portion 50 located generally above the horizontal axis line 52 of the ball 44 and a lower hemisphere portion 54 located generally below the horizontal axis line 52.

The bearing liner 18 is installed onto the ball 44 and seats within the spherical cavities provided by the hemispherical cavity surface 32 of housing 12 and the hemispherical cavity surface 38 of the housing plug 16. The unique construction of the bearing liner 18 according to the present invention, will be further discussed hereinafter with reference to the drawing FIGS. 3 and 4.

Figure 2:
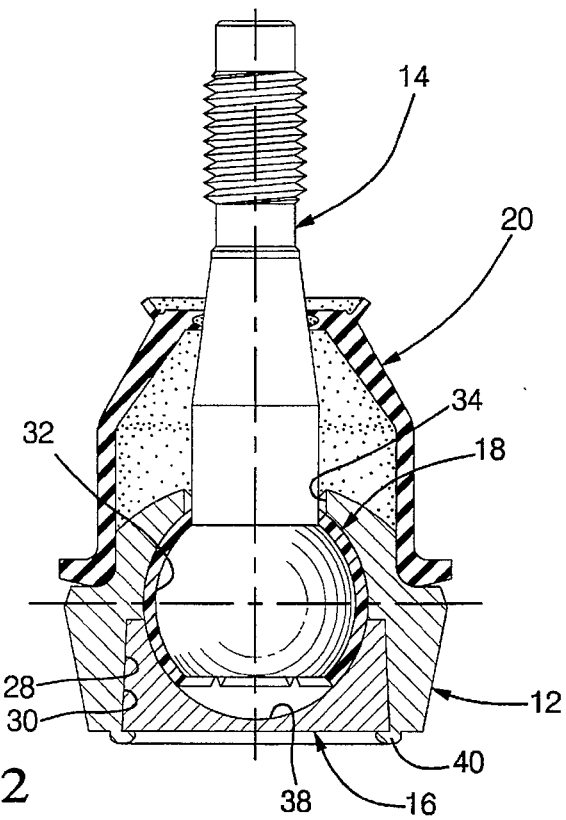
FIG. 2 is a section view taken in the direction of arrows 2—2 of FIG. 1.

As seen in FIGS. 1 and 2, the seal 20 is a molded rubber member which seats on the hub 26 of housing 12 and encircles the threaded stud 46. The seal prevents the entry of foreign matter into the ball and socket joint and yields readily to permit the relative movement between the ball stud 14 and the housing 12.

Figure 3:
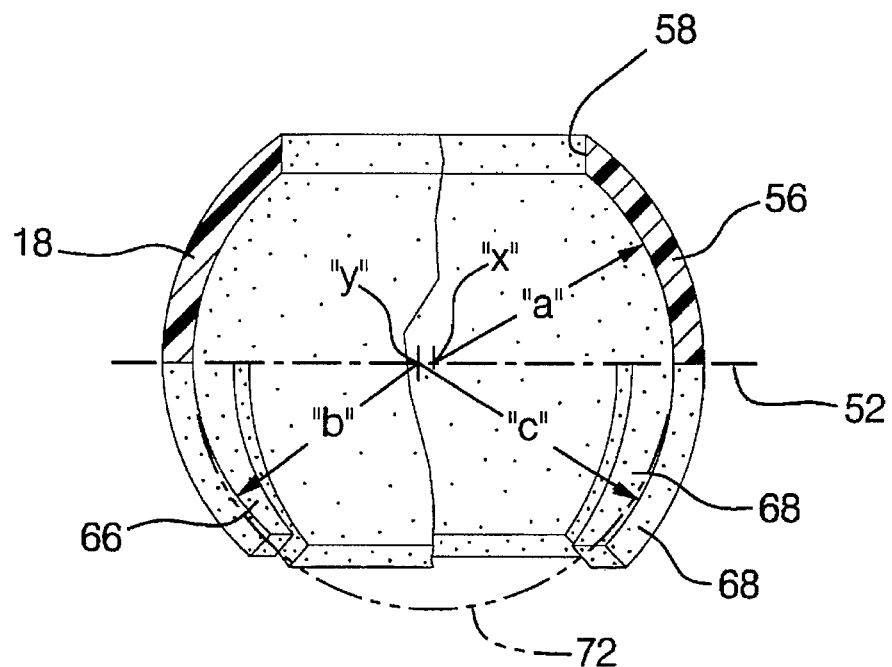
FIG. 3 is a side elevation view of the bearing liner of this invention having parts broken away and in section and shown in its free state unloaded condition prior to assembly into the ball and socket joint.
Figure 4:
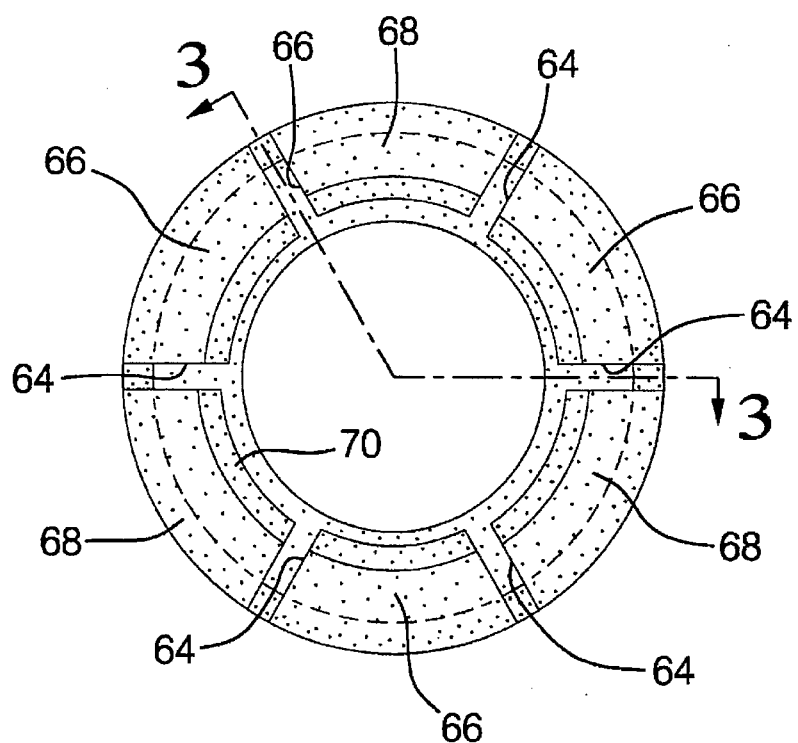
FIG. 4 is a top view of the bearing liner of FIG. 3.

Referring to FIGS. 3 and 4, it is seen that the bearing liner 18 is of molded plastic or composite injection molded manufacture. The upper hemisphere 56 of the bearing liner 18 has an opening 58 molded therein to receive the threaded stud 46 as shown in FIG. 1. The lower hemisphere portion 60 of the bearing liner 18 has a plurality of circumferentially spaced slots 64 which divide the lower hemisphere into alternating inward bent resilient fingers 66 and outward bent resilient fingers 68. The ends of these resilient fingers 66 and 68 are spaced away from one another by a central circular opening 70 so that the fingers 66 and 68 may flex relative to one another.

As best seen with reference to FIG. 3, the fingers 66 and 68 are molded integrally with the upper hemisphere 56. The inward bent fingers 66 are molded to reach inboard relative the circumferential circle 72 of the bearing liner 18 while the outwardly bent fingers 68 extend outwardly of the circumferential circle 72.

Referring again to FIG. 1, it will be appreciated that prior to assembly of the ball and socket, the bearing liner 18 of FIG. 3 can be lowered onto the shaft 46 of the ball socket 14 with the resilient fingers 66 and 68 yielding to permit the bearing liner 18 to snap-fit onto the ball 44. The inwardly bent fingers 66 resiliently grip the lower hemisphere 54 of the ball 42. The threaded stud 46 is then installed upwardly through the bore 28 of the housing 12 so that the upper hemisphere 56 of the bearing liner 18 engages against the hemispherical cavity surface 32 of the housing 12. The housing plug 16 is then installed into the bore 30 and the lip 40 is swaged into place. The assembly of the housing plug 16 into the housing 12 causes the outwardly bent spring fingers 68 to be forcibly compressed so that the spring fingers 66 continuously bear upon the hemispherical cavity surface 38 of the housing plug 16 to continuously compensate for any lash that might be present in the fit between the ball 44 and the housing cavity surfaces by urging the spherical ball 44 in a vertically upward direction. Upon loading of the ball ad socket in a horizontal direction outward, the fingers 68 will flex inward or outward as needed to permit force transmitting alignment between the housing and the ball stud 14.

The relative inward and outward bending of the fingers is readily accomplished during the molding of the bearing liner 18. For example, assuming the radius "a" of curvature of the upper hemisphere 56 of the liner 18 is 12 millimeters about the center "x" of the upper hemisphere 56, the inward bent fingers 66 can be molded on a radius "b" of 11 millimeters about a center "y" which is offset one millimeter from the center "x", and the outward bent fingers 68 can be molded on a radius "c" of 13 millimeters about the center "y".

Thus it is seen that the invention provides an improved ball stud assembly in which the provision of resilient fingers on the bearing liner bear outwardly against the housing to facilitate low friction relative movement between the ball and the housing and also compensate for lash which might develop in the bearing assembly.

I claim:

1. A ball and socket joint comprising:

a stud having a spherical ball with upper and lower hemispheres;

a socket housing having a bore defining an access opening through which the stud may be inserted into the housing and a hemispherical cavity surface for receiving the upper hemisphere of the stud;

a housing plug for closing the bore of the socket housing and having a hemispherical cavity surface adapted for receiving the lower hemisphere of the stud; and a spherical bearing liner interposed between the spherical ball and the hemispherical cavity surfaces of the socket housing and the housing plug, said bearing liner having upper and lower hemispheres and one of the hemispheres having a plurality of longitudinal through slots defining a plurality of resilient spring fingers, said spring fingers being arranged to alternately seat against the ball and apply spring force against the housing plug to thereby eliminate lash in the ball and socket joint.

2. The ball and socket joint of claim 1 having an even number of spring fingers, with alternating fingers respectively curved inward to grip the spherical ball and outwardly to bear on the hemispherical cavity surface to eliminate lash.

3. The ball and socket joint of claim 1 in which the bearing liner is of molded plastic construction.

4. A ball and socket joint comprising:

a stud having a spherical ball with upper and lower hemispheres;

a socket housing having a bore defining an access opening through which the stud may be inserted into the housing and a hemispherical cavity surface for receiving the upper hemisphere of the stud;

a housing plug for closing the bore of the socket housing and having a hemispherical cavity surface adapted for receiving the lower hemisphere of the stud; and a molded plastic spherical bearing liner interposed between the spherical ball and the hemispherical cavity surface of the socket housing and the housing plug, said bearing liner having an unsegmented upper hemisphere acting between the upper hemisphere of the spherical ball and the hemispherical cavity surface of the socket housing, and a segmented lower hemisphere integral with the upper hemisphere and having an even numbered plurality of resilient spring fingers, said spring fingers being molded to alternately curve inward and outward to respectively grip the spherical ball and apply spring force against the hemispherical cavity surface of the housing plug to thereby eliminate lash in the ball and socket joint.

* * * * *